United States Patent [19]
Alberino et al.

[11] 3,708,458
[45] Jan. 2, 1973

[54] COPOLYIMIDES OF BENZOPHENONE TETRACARBOXYLIC ACID DIANHYDRIDE AND MIXTURE OF DIISOCYANATES

[75] Inventors: Louis M. Alberino, Cheshire; William J. Farrissey, Jr., James S. Rose, Guilford, Conn.

[73] Assignee: The Upjohn Company, Kalamazoo, Mich.

[22] Filed: March 16, 1971

[21] Appl. No.: 124,958

Related U.S. Application Data

[63] Continuation-in-part of Ser. No. 75,667, Sept. 25, 1970, abandoned.

[52] U.S. Cl.............260/65, 260/63 N, 260/77.5 R, 260/78 TF
[51] Int. Cl. .............................................C08g 20/32
[58] Field of Search.......260/63 N, 65, 77.5 R, 78 TF

[56] References Cited

UNITED STATES PATENTS

| | | | |
|---|---|---|---|
| 3,489,696 | 1/1970 | Miller | 260/2.5 |
| 3,422,061 | 1/1969 | Gall | 260/47 |
| 3,347,808 | 10/1967 | Lavine et al. | 260/29.1 |
| 3,546,175 | 12/1970 | Angelo | 260/65 |

FOREIGN PATENTS OR APPLICATIONS 1,962,588  7/1970  Germany..............................260/65

*Primary Examiner*—William H. Short
*Assistant Examiner*—L. L. Lee
*Attorney*—Denis A. Firth et al.

[57] ABSTRACT

Copolyimides are prepared from benzophenone-3,3',4,4'-tetracarboxylic acid dianhydride and a mixture of 4,4'-methylenebis(phenyl isocyanate) and toluene diisocyanate (2,4- or 2,6-isomer or mixtures thereof). The mixture of isocyanates is used in a molar percent ratio from about 10/90 to 90/10, respectively. The copolyimides so obtained show markedly improved mold flow properties and higher glass transition temperature as compared with polyimides made from 4,4'-methylenebis(phenyl isocyanate) alone. The improvement in mold flow properties in the copolyimides is achieved without any significant loss in structural strength properties; this is contrary to expectation based on the known properties of the corresponding polyimide made from toluene diisocyanate alone. The copolyimides which are obtained from the isocyanate mixtures in which the toluene diisocyanate is the major component have the additional advantage of being soluble in polar solvents and, accordingly, find use in coating compositions and the like. All the copolyimides prepared as described above can be used in the preparation of high temperature resistant polymer articles and in the various applications for which polyimides are known to be especially adapted.

5 Claims, No Drawings

COPOLYIMIDES OF BENZOPHENONE TETRACARBOXYLIC ACID DIANHYDRIDE AND MIXTURE OF DIISOCYANATES

CROSS-REFERENCE TO RELATED APPLICATION

This application is a continuation-in-part of copending application, Ser. No. 75,667, filed Sept. 25, 1970 now abandoned.

BACKGROUND OF THE INVENTION

1. Field of the Invention

This invention relates to novel polymers and is more particularly concerned with novel polyimides and process for their preparation.

2. Description of the Prior Art

The preparation of a polyimide from benzophenone-3,3',4,4'4,4'-methylenebis(phenyl isocyanate) or the corresponding diamine, is well-known in the art. The resulting polyimide possesses highly useful structural strength properties but suffers the disadvantage that it has a relatively low glass transition point and, hence, relatively low resistance to loss of structural strength on exposure to high temperature. Further, the polyimide in question is difficult to mold, by compression at elevated temperatures, because of its relatively poor flow properties in the mold.

We have now found that the mold flow properties and the resistance to structural strength loss at elevated temperatures of the above polyimide can be improved markedly by incorporating into said polyimide a proportion of recurring units corresponding to a second polyimide, namely, that derived from benzophenone-3,3',4,4'-tetracarboxylic acid dianhydride and toluene diisocyanate (or the corresponding diamine). Surprisingly, the formation of the copolyimide does not result in any significant reduction in the desirable structural strength properties of the polyimide derived from 4,4'-methylenebis(phenyl isocyanate) alone. This is, indeed, a useful and unexpected finding in that the polyimide derived from toluene diisocyanate (or the corresponding diamine) alone has relatively poor structural strength properties.

We have also found that certain of the copolyimides of the invention, as will be discussed in more detail hereinafter, possess marked solubility in polar solvents which solubility makes these copolyimides especially useful in the coating art.

SUMMARY OF THE INVENTION

This invention comprises novel copolyimides characterized by the presence of a recurring unit of the formula:

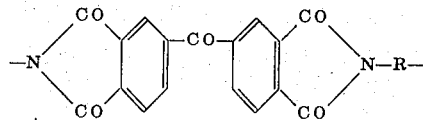

wherein from 10 to 90 percent of said recurring units are those in which R represents:

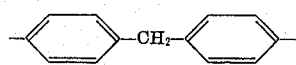

and the remainder of said units are those in which R represents a member selected from the group consisting of:

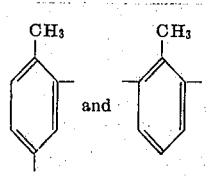

and mixtures thereof.

DETAILED DESCRIPTION OF THE INVENTION

The novel copolyimides of the invention can be prepared by any of the methods known in the art for the preparation of polyimides from the appropriate anhydride and the appropriate polyisocyanate or corresponding polyamine. Illustratively, the copolyimides of the invention can be prepared by reacting benzophenone-3,3',4,4'-tetracarboxylic acid dianhydride with the appropriate mixture of di(4-aminophenyl)methane and toluene diamine (2,4-isomer or 2,6-isomer, or a mixture thereof), of with one of said diamines followed subsequently in the reaction by the other of said diamines, to obtain the corresponding polyamide acid according to the following equation:

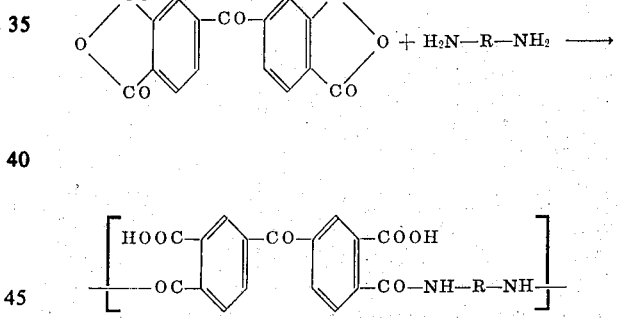

wherein R has the significance above defined. Advantageously, the reactants are brought together in the presence of an inert solvent, i.e., a solvent which does not react with either of the reactants nor interfere in any way with the desired course of the reaction. Examples of inert organic solvents are dimethylformamide, dimethylacetamide, dimethylsulfoxide, dimethylsulfone, hexamethylphosphoramide, N-methyl-2-pyrrolidone, tetramethylurea, pyridine, and the like.

The reaction of the amines and the anhydride is preferably conducted under anhydrous conditions and at temperatures below 50° C. but in some cases temperatures up to 175° C. may be employed. The desired polyamide acid generally is soluble in the reaction mixture and can be isolated therefrom, if desired, by conventional methods such as by evaporation of the reaction solvent or precipitation by a non-solvent. The amide acid is then converted to the desired polyimide by dehydration. The dehydration can be accomplished readily by treating the amide acid with an acid anhydride such as acetic anhydride, propionic anhydride, benzoic anhydride and the like, preferably in the presence of a tertiary amine such as pyridine, N,N-dimethylaniline and the like. The ring closure is advantageously conducted at elevated temperatures of 200° C. or higher. Alternatively, the ring closure of the polyamide acid to the desired polyimide can be effected by heat alone.

Illustrative of references which described detailed conditions for carrying out the above reactions are U.S. Pat. Nos. 3,179,630 and 3,179,631 and Scroog et al., J. Polymer Science Part A, Vol. 3, pages 1,373 to 1,390, 1965.

Preferably the copolyimides of the invention are prepared by reaction of benzophenone-3,3′,4,4′-tetracarboxylic acid dianhydride with the appropriate molar proportions of 4,4′-methylenebis(phenyl isocyanate) and toluene diisocyanate (2,4-isomer or 2,6-isomer or mixtures thereof) in the presence of a dipolar aprotic solvent. Illustrative of the latter solvents are dimethyl sulfoxide, dimethylacetamide, hexamethylphosphoramide, N-methyl-2-pyrrolidone, tetramethyl urea, pyridine and the like. The reaction takes place readily when the reactants are brought together at ambient temperatures but elevated temperatures, up to about 160°C can be employed, if desired, in order to increase the rate of reaction. In carrying out the reaction the dianhydride can be brought together with the mixture of methylenebis(phenyl isocyanate) and toluene diisocyanate so that reaction between the anhydride and each isocyanate occurs simultaneously with production of a random copolyimide. However, there is a marked disparity between the rates of reaction of the two isocyanates with the anhydride, the methylenebis(phenyl isocyanate) being the more reactive of the two. Accordingly, particularly where the toluene diisocyanate is the minor component of the two isocyanates, i.e., in the preparation of copolyimides in which the number of recurring units based on toluene diisocyanate is less than 50 percent, it is preferred to react the toluene diisocyanate with the benzophenone tetracarboxylic acid dianhydride as the first step of the polyimide formation. When this reaction is complete, as detected by infrared spectral analysis (absence of absorption corresponding to free NCO) or by cessation of carbon dioxide evolution, the second diisocyanate is added and the reaction is allowed to go to completion to achieve the desired copolyimide. The latter is then a block, as opposed to a random, copolymer. The precise composition of the copolyimide, i.e., the ratio of numbers of recurring units corresponding to the imides from toluene diisocyanate and methylenebis(phenyl isocyanate), is controlled by selecting the appropriate molar proportions of the diisocyanates used in the above reaction. Whatever the relative proportions of the isocyanates which are employed, the total amount of isocyanates employed in the reaction is such as to be substantially equimolar with respect to the benzophenone tetracarboxylic acid dianhydride.

The amount of dipolar aprotic organic solvent employed in the above described reaction is advantageously at least sufficient to ensure that all the reactants are in solution initially. Advantageously, the amount of solvent employed is at least about 400 parts per 100 parts of dianhydride and preferably is at least about 500 parts per 100 parts of dianhydride. The upper limit on the amount of solvent employed is dictated purely by economic considerations. Generally speaking, an amount of solvent corresponding to about 1,500 parts per 100 parts of dianhydride is a practical upper limit for the above reaction.

In general, the desired copolyimide of the invention separates as a solid from the reaction mixture as it is formed in the above described reaction. However, it is found that copolyimides of the invention in which the proportion of recurring units derived from toluene diisocyanate is relatively high, of the order of 70 percent or higher, possess marked solubility in many of the dipolar organic solvents employed in the above reactions. Copolyimides having such solubility are readily precipitated from the final reaction product by addition of a solvent such as acetone, tetrahydrofuran, methylethylketone, chloroform, xylene, benzene, hexane, and the like in which the copolyimide is insoluble. The use of a precipitating solvent is also a convenient way of obtaining additional amounts of copolyimide from the reaction products after removal of the insoluble polyimide precipitated while the reaction is in progress.

The copolyimides so obtained can be purified, if desired, by washing with appropriate solvents in which impurities, such as unreacted starting materials, are soluble.

The copolyimides are generally obtained as powders or coarse solid materials. In order that they can be fabricated into useful high temperature resistant articles, such as those which are commonly prepared from polyimides, it is necessary to mold the copolyimide. This is accomplished generally by converting the copolyimide to a fine powder and subjecting the latter to molding using techniques conventionally employed in molding powdered metals such as by sintering or hot pressing; see, for example, "Encyclopedia of Chemical Technology," edited by Kirk and Othmer, Interscience Encyclopedia Inc., Vol. 11, pages 54–55, New York, 1953.

It is in the behavior on molding that at least part of the highly useful properties of the copolyimides of the invention are manifested. Thus, the copolyimides of the invention exhibit markedly better flow properties on molding than do the corresponding polyimides made from methylenebis(phenyl isocyanate) alone. Further, the higher glass transition temperatures of the copolyimides of the invention, as compared with the polyimide derived from methylenebis(phenyl isocyanate) alone, means that a corresponding increase in high temperature stability is achieved. As pointed out previously, these advantages are achieved without any significant loss of the highly desirable structural strength properties associated with the polyimide derived from methylenebis(phenyl isocyanate) alone. This finding is particularly surprising in view of the markedly lower structural strength properties possessed by polyimides derived from toluene diisocyanate alone.

The copolyimides of the invention can be employed for any of the uses to which high temperature resistant polyimides are currently put in the art, for example, the copolyimides of the invention can be molded in the form of bushings, seal faces, electric insulators, compressor vanes and impellers, pistons and piston rings, gears, thread guides, cams, brake lining, clutch faces, abrasive articles and the like. Those copolyimides which contain high proportions of recurring units derived from toluene diisocyanate and which accordingly are soluble in organic solvents, can be employed in the preparation of polyimide coating compositions and can thereby be employed in wire coating and in the casting or spraying of polyimide films on a variety of substrates such as metal, ceramic, fabrics, polymerics and the like.

Indeed, those copolyimides of the invention which are soluble in organic solvents represent a particularly useful advance in the art since they provide, for the first time, a means of molding or fabricating high temperature resistant polyimides without the need to carry out a final chemical reaction to produce the polyimide in situ. Thus, in order to produce polyimide coatings having useful high temperature resistant properties on a variety of substrates such as wire, fabrics and the like, or to apply polyimides as high temperature resistant adhesives for metals and the like, it has hitherto been necessary to use a solvent soluble polyimide-forming precursor which is applied in organic solvent solution as a coating or the like and is then converted in situ to the desired polyimide by heat treatment, or chemical treatment and the like; see, for example, U.S. Pat. No. 3,179,630. This method of producing polyimide coatings and the like has given rise to difficulties due partly to the instability on storage of the polyimide precursor and partly to the need to remove volatile materials during the final conversion of the prepolymer. For example, it has proved difficult to avoid the formation of bubbles or voids in the finished product. In contrast, the soluble copolyimides of the invention can be applied directly as a coating or adhesive and removal of the carrier solvent is the only operation to be accomplished after application. Further, because of the thermoplasticity of these copolyimides, shaping or molding of the coated material can be accomplished after removal of solvent. This is of particular advantage in the preparation of laminates and the like from fabric and like materials coated with the copolyimides of the invention.

The organic solvent soluble copolyimides of the invention also show advantages over high temperature resistant polyimides hitherto known in that their properties enable them to be used to produce articles having reinforcing or modifying fillers and the like incorporated therein. Thus, fillers such as fiberglass, carbon fibers, graphite, molybdenum disulfide (to impart lubricity), powdered metals such as aluminum, copper and the like, and abrasive materials (for producing grinding wheels and the like) can be added to solutions of the soluble copolyimides of the invention and intimately mixed therewith prior to removal of solvent followed by heat pressing or like techniques necessary to achieve production of the desired article. Other processing advantages which accrue from the high temperature resistance, solvent solubility and thermoplasticity of these copolyimides of the invention will be apparent to one skilled in the art.

The following examples describe the manner and process of making and using the invention and set forth the best mode contemplated by the inventors of carrying out the invention but are not to be construed as limiting.

EXAMPLE 1

A solution of 80.5 g (0.25 mole) of benzophenone-3,3',4,4'400 g of dimethylsulfoxide (previously distilled and dried over molecular sieves) was prepared under nitrogen. To the solution was added 8.7 g (0.05 mole) of toluene diisocyanate [mixture of 2,4-isomer (80 percent) and 2,6-isomer (20 percent); previously redistilled under nitrogen] and the mixture so obtained was heated at 100° C. until no absorption band at 4.4μ was detectable in the infrared spectrum of an aliquot of the reaction mixture. The resulting solution was cooled to approximately 25° C. and a solution of 50 g (0.2 mole) of 4,4'-methylenebis(phenyl isocyanate) in 50 g of dimethylsulfoxide was added. After the addition was complete the mixture was stirred and maintained at about 35° C. under nitrogen. About 90 minutes after the addition of the isocyanate, solid material began to separate from solution. The reaction mixture was stirred continuously for a further 22.5 hours at the end of which time the slurry was poured into 3 liters of acetone. The solid precipitate was isolated by filtration and washed with acetone. The filtrate was concentrated by evaporation to a volume of about 200 ml and then poured into an excess of acetone. The precipitate which separated was isolated by filtration and combined with the first precipitate. The combined material was placed in 1 liter of acetone and the mixture was heated at about 50° C. for 2 hours. The insoluble material was thereafter isolated by filtration, placed in an air oven at 40° to 50° C. for several hours to remove acetone and, finally, placed in a vacuum oven at 195° C. for 6 hours to remove excess dimethylsulfoxide. The resulting solid was ground to remove hard lumps and yield a free-flowing powder. There was thus obtained 106.7 g (91 percent theoretical yield) of a copolyimide (coded "polyimide 80/20") wherein approximately 20 percent of the recurring units had the structure

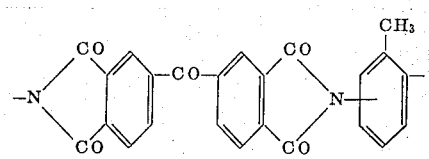

and approximately 80 percent of the recurring units had the structure

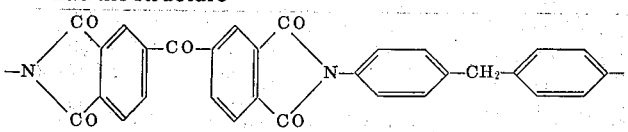

The copolyimide was a yellow powder having an inherent viscosity ($\eta inh$) of 0.28 in concentrated sulfuric acid (0.2 percent; 30° C.).

Test sheets (3×4×0.05 inch) of copolyimide 80/20 were pressed out from the powder using the following procedure. The press was a Wabash 30 ton hydraulic press equipped with a set of 3×4 inches heated platens.

Stainless steel plates (3×4 inches) were used on the platen and were sprayed with mold release agent and preheated in the press at the desired temperature and 20,000 to 30,000 pounds ram force for 10 to 15 minutes. The press was then opened and a weighed amount of copolyimide powder was placed on the plate on the lower platen. The top plate was then placed on the powder and the press closed tight with a load force of 2,000 pounds. The powder was allowed to preheat for a selected amount of time before raising the force on the platens to the desired level. The sample was held under heat and pressure for the specified length of time before shutting off the heat and allowing the sample to cool for 30 minutes while maintaining the pressure. At the end of this time the pressed sheet was demolded, allowed to cool to room temperature, and then submitted to physical testing. The following table records the pressing conditions employed to prepare four sheets of the above polyimide 80/20 and the physical properties determined on each of the sheets.

TABLE I

Pressing and Properties of Polyimide 80/20

| Pressing Conditions | Sheet 1 | 2 | 3 | 4 |
|---|---|---|---|---|
| Charge wt (g) | 6 | 6 | 8 | 6 |
| Platen temp. (°C) | 350–385 | 350–385 | 330–365 | 330–365 |
| Preheat time (min) | 2 | 2 | 2 | 2 |
| Ram force (lbs) | 50,000 | 50,000 | 50,000 | 50,000 |
| Minutes at pressing tempe & press | 6 | 6 | 6 | 6 |
| Temp. after 30 min cooling (°C) | 155 | 150 | 150 | 160 |
| Quality of sheet Properties | Good | Good | Good | Good |
| Density g/cc | 1.3390 | 1.3380 | 1.3380 | 1.3380 |
| Ultimate Tensile (ASTM 638–68)psi | 15,250 | 14,630 | 13,800 | 15,500 |
| Modulus (ASTM 638–68)psi | 285,000 | 273,300 | 280,000 | 320,000 |
| No. of samples in average | 2 | 3 | 3 | 4 |

A glass transition temperature of 291° C. was determined on Sheet 1 above from a plot of modulus temperature determined using the procedure of ASTM D 1053–58T on a modified Gehman Torsion Stiffness Tester, fitted with a heavy duty furnace to allow operation up to 500° C.

EXAMPLE 2

Using the procedure described in Example 1 but adjusting the quantities of 4,4'-methylenebis(phenyl isocyanate) and toluene diisocyanate to 54 g (0.216 mole) and 7.74 g (0.044 mole), respectively, there was obtained 106.0 g (88.9 percent theoretical yield) of a copolyimide (coded "polyimide 85/15") wherein approximately 15 percent of the recurring units had the structure

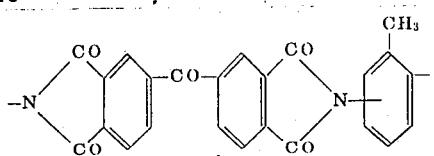

and approximately 85 percent of the recurring units had the structure

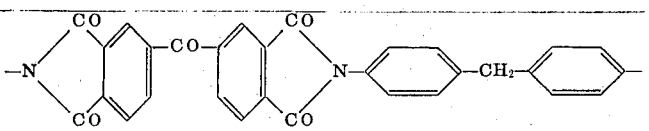

A series of sheets were pressed from the polyimide powder using the procedure described in Example 1 and using the conditions set forth in Table II below. The physical properties determined on the sheets are also recorded in Table II.

TABLE II

Pressing and Properties of the Polyimide 85/15

| Pressing Conditions | Sheet 1 | 2 | 3 | 4 |
|---|---|---|---|---|
| Charge wt (g) | 6 | 8 | 8 | 6 |
| Platen temp (°C) | 350–385 | 350–385 | 350–385 | 330–380 |
| Preheat time (min) | 2 | 2 | 2 | 4 |
| Ram force (lbs) | 60,000 | 50,000 | 50,000 | 50,000 |
| Min. at pressing temp | 6 | 8 | 8 | 6 |
| Temp after 30 min cooling (°C) | 165 | 180 | 180 | 160 |
| Quality of sheet Properties | Good | Good | Good | Good |
| Tensile psi | 14,800 | 15,230 | 13,650 | 12,310 |
| Elongation at break (%) | 7.9 | 7.7 | 8.1 | 5.0 |
| Modulus | 290,000 | 313,300 | 273,300 | 320,000 |
| No. of samples in average | 4 | 4 | 3 | 2 |

A glass transition temperature determined on Sheet 1 above was 287° C.; method used was that set forth in Example 1.

EXAMPLE 3

Using the procedure described in Example 1, but adjusting the quantities of 4,4'-methylenebis(phenyl isocyanate) and toluene diisocyanate to 31.25 g (0.125 mole) and 21.75 g (0.125 mole) respectively, there was obtained 102.5 g (92.2 percent theoretical) of a copolyimide (coded "polyimide 50/50") wherein approximately 50 percent of the recurring units had the structure

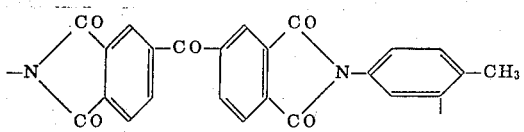

and approximately 50 percent of the recurring units had the structure

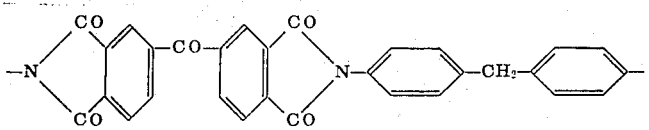

The polyimide 50/50 had an inherent viscosity of 0.21 in concentrated sulfuric acid (0.2 percent; 30° C.). A series of sheets were pressed from the polyimide 50/50 powder using the procedure described in Example 1 and using the conditions set forth in Table III below. The physical properties determined on the sheets are also recorded in Table III.

TABLE III

Pressing and Properties of Polyimide 50/50

| Pressing Conditions | Sheet 1 | 2 | 3 |
| --- | --- | --- | --- |
| Charge wt (g) | 8 | 8 | 8 |
| Platen temp (°C) | 350–385 | 350–385 | 330–365 |
| Preheat time (min) | 2 | 2 | 2 |
| Ram force (lbs) | 50,000 | 50,000 | 50,000 |
| Min at pressing temp. | 6 | 6 | 6 |
| Temp after 30 min cooling (°C) | 165 160 | | 170 |
| Quality of sheet Properties | Good | Good | Good |
| Tensile psi | 12,670 | 13,230 | 14,370 |
| Elongation at break (%) | 6.8 | 6.8 | 6.8 |
| Modulus 271,000 | 271,000 | 263,000 | 264,000 |
| Density | 1.3420 | 1.3440 | 1.3435 |
| No. of samples in average | 4 | 4 | 4 |

A glass transition temperature determined on Sheet 1 was 297° C.; method used was that set forth in Example 1.

EXAMPLE 4

Using the procedure described in Example 1, but adjusting the quantities of 4,4'-methylenebis(phenyl isocyanate) and toluene diisocyanate to 12.5 g (0.05 mole) 4,4'-methylenebis(phenyl isocyanate) and 34.8 g (0.20 mole) of toluene diisocyanate, respectively, there was obtained 97.4 g (92 percent theoretical yield) of a copolyimide (coded "polyimide 20/80") wherein approximately 80 percent of the recurring units had the structure

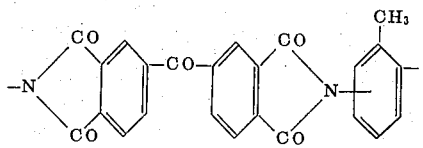

and approximately 20 percent of the recurring units had the structure

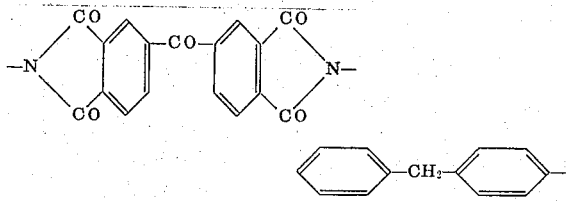

The polyimide 20/80 had an inherent viscosity of 0.28 in dimethylsulfoxide (0.5 percent; 30° C.). A series of sheets were pressed from the polyimide 20/80 powder using the procedure described in Example 1 and using the conditions set forth in Table IV below. The physical properties determined on the sheets are also recorded in Table IV.

TABLE IV

Pressing and Properties of Polyimide 20/80

| Pressing conditions | Sheet 1 | 2 | 3 | 4 | 5 |
| --- | --- | --- | --- | --- | --- |
| Charge wt (g) | 6 | 6 | 6 | 6 | 6 |
| Platen temp (°C) | 350–385 | — | — | — | — |
| Preheat time (min) | 5 | — | — | — | — |
| Ram force (lbs) | 30,000 | — | — | — | — |
| Min at Pressing temp | 4 | — | — | — | — |
| temp after 30 min cooling(°C) | 120°C | — | — | — | — |
| Quality of sheet properties | Good | — | — | — | — |
| Tensile psi | 15970 | 15830 | 15460 | 16500 | 17100 |
| elongation at break % | 6.0 | 6.6 | 7.2 | 6.1 | 6.5 |
| Modulus | 289,000 | 281,000 | 253,000 | 321,000 | 331,000 |

A glass transition temperature determined on this material was 304° C.

EXAMPLE 5

For purposes of comparison, polyimides were prepared using the procedure described in Example 1, but employing 4,4'-methylenebis(phenyl isocyanate) [62.5 g; 0.25 mole] as the sole isocyanate in one case and employing toluene diisocyanate [mixture of 2,4-isomer and 2,6-isomer; 43.5 g (0.05 mole)] as sole isocyanate in the other case. The two polyimides, referred to hereafter as "polyimide — MDI" and "polyimide — TDI" had inherent viscosities of 0.57 and 0.42 in concentrated sulfuric acid (0.2 percent; 30° C.). A series of sheets were pressed from each of the two polyimides using the procedure described in Example 1 and the conditions set forth in Table V below. The sheets produced from polyimide — TDI were of poor quality due presumably to the lower structural strength properties of this material. The physical properties determined on the sheets are recorded in Table V.

TABLE V

Pressing and Properties of Polyimide - MDI and Polyimide - TDI

| Pressing Conditions | Polyimide-MDI | | Polyimide-TDI |
| --- | --- | --- | --- |
| | Sheet 1 | 2 | 1 |
| Charge wt (g) | 6 | 6 | 6 |
| Platen temp (°C) | 350–385 | 350–385 | 330–360 |
| Preheat time (min) | 2 | 2 | 2 |
| Ram force (lbs) | 60,000 | 50,000 | 50,000 |
| min at pressing temp | 6 | 6 | 6 |
| Temp after 30 min cooling (°C) | 160 | 90(60 min) | 150 |
| Quality of sheet Properties | Good | Good | Poor |
| Density g/cc | 1.3425 | 1.3380 | 1.3490 |
| Tensile psi | 14310 | 14230 | 9800 |
| Elongation at break (%) | 7.9 | 8.0 | 3.3 |
| Modulus | 293,300 | 295,000 | 280,000 |
| No. of samples in average | 3 | 2 | 1 |
| Glass transition temp | 284 | 284 | 314 |

EXAMPLE 6

This example demonstrates the enhanced flowability of the copolyimides of the invention compared to the corresponding polyimide derived from methylenebis(phenyl isocyanate) alone. The comparison was made by pressing sheets from the powdered polyimides under standard conditions using two stainless steel plates (3×4 inches) coated with mold release. A standard charge of 8 g of powder was used in each case, this amount being more than required to produce a 3×4×0.05 inch sheet. The excess material (i.e., the amount in excess of that required to produce the sheet of the dimensions above) flows out from between the pressing plates. The amount of material ("flashing") which flows out between the plates under standardized conditions is directly related to the flowability of the polyimide under test.

The precise conditions used in the pressing in all cases were as follows. The press employed was that described in Example 1. The platens on the press were preheated and the temperature controlled in the range of 330° to 360° C. The bottom stainless steel plate was also preheated within the same range. The powdered sample (8 g) was loaded on the bottom stainless steel plate. After 1.6 minutes from the beginning of loading an initial force of 2,000 lbs was applied on the RAM. After 4 minutes from loading time, the final force of 50,000 lbs was applied and maintained until 30 minutes from loading. After 8 minutes from loading the heat was shut off but the pressure maintained. At the end of 30 minutes from loading, the pressure was released and the sample demolded. The pressed sample, including flashing, was weighed. The flashing was then cut off from the sample and the remaining 3×4 inch sheet was again weighed. The difference between the weights before and after cutting represents the weight of flashing and this was then calculated as a percentage of the total material as a measure of flowability.

The data obtained on the various polyimides is summarized in Table VI.

TABLE VI

| Polyimide | % Flash |
| --- | --- |
| Polyimide - TDI | 32.5 |
| Polyimide 20/80 | 34.8 |
| Polyimide 50/50 | 41.5 |
| Polyimide 80/20 | 32.5 |
| Polyimide 85/15 | 39.5 |
| Polyimide - MDI | 16.7 |

The above data shows the markedly greater flowability of the copolyimides of the invention as compared with the polyimide made from methylenebis(phenyl isocyanate) alone.

EXAMPLE 7

The example illustrates the preparation of a copolyimide from a mixture of methylenebis(phenyl isocyanate) and toluene diisocyanate in which the two isocyanates are reacted simultaneously, rather than sequentially, with the acid dianhydride. The ratio of equivalents of toluene diisocyanate to methylenebis(phenyl isocyanate) in the reaction mixture is 4:1.

A mixture of 128.9 g (0.4 mole) of 3,3',4,4'-benzophenone tetracarboxylic acid dianhydride, 1.5 g of antioxidant (1,3,5-trimethyl-2,4,6-tris[3,5-di-t-butyl-4-hydroxybenzyl]benzene) and 750 ml of N-methylpyrrolidinone was heated under an atmosphere of dry carbon dioxide to 85° C. A mixture of 55.75 g (0.321 mole) of toluene-2,4-diisocyanate and 20.2 g (0.081 mole) of 4,4'-methylenebis(phenyl isocyanate) was added dropwise over a period of 7 hours to the above solution with stirring. The temperature of the reaction mixture was maintained at 84° C. throughout the addition and thereafter for a period of 17 hours. At the end of this time a small quantity (3.024 g) of toluene -2,4-diisocyanate in 50 ml of N-methylpyrrolidinone was added dropwise with stirring over a period of 6 hours. The temperature of the reaction mixture was maintained unchanged at 84° C. during this second addition. After the addition was complete the reaction mixture was allowed to cool to room temperature (circa 25° C.) and then diluted by the addition of 800 ml of N-methylpyrrolidinone. The resulting solution was slowly added with stirring to 2000 ml of isopropyl alcohol. The solid which separated was isolated by filtration, ground in a Waring blender and washed with two 2,000 ml portions of isopropyl alcohol. The solid precipitate was then dried in a vacuum oven for 24 hours at 190° C. and a pressure of 0.2 to 0.5 mm of mercury. There was thus obtained 152 g of a random copolyimide wherein approximately 80 percent of the recurring units had the structure:

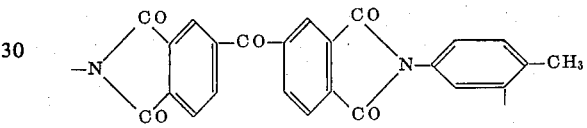

and approximately 20 percent of the recurring units had the structure:

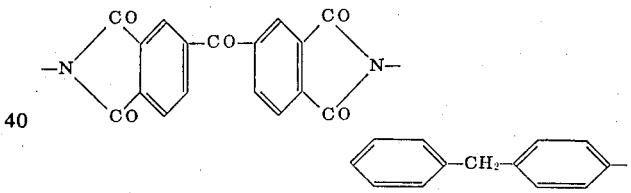

The copolyimide had an inherent viscosity of 0.4 (1 percent solution in dimethylsulfoxide).

A series of three sheets were pressed from the above polyimide using the same procedure and pressing conditions described in Example 1. The following are the average values obtained in tests carried out on the sheets:

| | |
| --- | --- |
| Tensile psi | : 16,000 |
| Elongation at break | : 6% |
| Modulus | : 300,000 |

A glass transition temperature determined on one sheet using the method set forth in Example 1 was 310° C.

In addition a series of three films was cast from a solution of the polyimide in the dimethylacetamide. The following are the average values obtained in tests carried out on these films:

| | |
| --- | --- |
| Tensile psi | : 18,000 |
| Modulus | : 300,000 |

We claim:

1. A copolyimide consisting essentially of recurring units of the formula

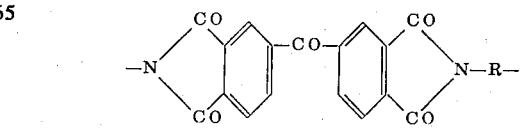

wherein from 10 to 90 percent of said recurring units are these in which R represents

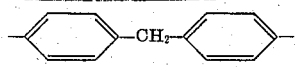

and the remainder of said units are those in which R represents a member selected from the group consisting of

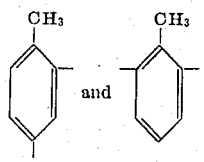

and mixtures thereof.

2. A copolyimide according to claim 1 wherein 85 percent of said recurring units are those in which R represents

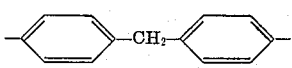

and the remaining 15 percent of said recurring units are those in which R represents a member selected from the group consisting of

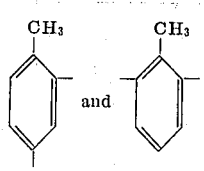

and mixtures thereof.

3. A copolyimide according to claim 1 wherein 50 percent of said recurring units are those in which R represents

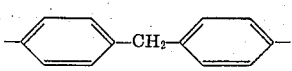

and the other 50 percent of said recurring units are those in which R represents a member selected from the group consisting of

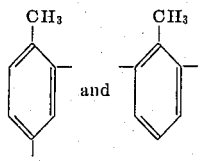

and mixtures thereof.

4. A copolyimide according to claim 1 wherein 20 percent of said recurring units are those in which R represents

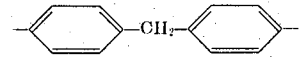

and the remaining 80 percent of said recurring units are those in which R represents a member selected from the group consisting of

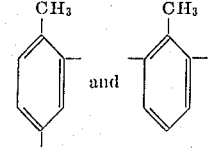

and mixtures thereof.

5. A copolyimide according to claim 1 wherein 80 percent of said recurring units are those in which R represents

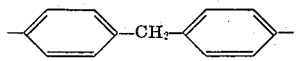

and the remaining 20 percent of said recurring units are those in which R represents a member selected from the group consisting of

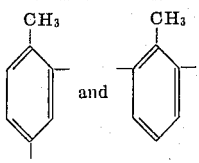

and mixtures thereof.

* * * * *